(12) United States Patent
Kojima et al.

(10) Patent No.: US 9,214,840 B2
(45) Date of Patent: Dec. 15, 2015

(54) FAN MOTOR, ON-VEHICLE AIR CONDITIONER USING THE FAN MOTOR, AND METHOD FOR ASSEMBLING FAN MOTOR

(75) Inventors: Masao Kojima, Osaka (JP); Tomohiko Naya, Osaka (JP); Koji Kuyama, Hyogo (JP); Yasushi Kamada, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 455 days.

(21) Appl. No.: 13/640,998

(22) PCT Filed: Jun. 9, 2011

(86) PCT No.: PCT/JP2011/003267
§ 371 (c)(1),
(2), (4) Date: Oct. 12, 2012

(87) PCT Pub. No.: WO2011/158471
PCT Pub. Date: Dec. 22, 2011

(65) Prior Publication Data
US 2013/0034453 A1    Feb. 7, 2013

(30) Foreign Application Priority Data
Jun. 14, 2010    (JP) ................. 2010-134758

(51) Int. Cl.
*F04D 29/64* (2006.01)
*H02K 5/24* (2006.01)
(Continued)

(52) U.S. Cl.
CPC ............... *H02K 5/24* (2013.01); *F04D 29/263* (2013.01); *F04D 29/646* (2013.01); *F04D 29/668* (2013.01); *H02K 5/1675* (2013.01); *H02K 7/085* (2013.01); *Y10T 29/49245* (2015.01)

(58) Field of Classification Search
CPC ... F04D 29/263; F04D 29/646; F04D 29/668; F16D 1/06; H02K 5/24; H02K 5/1675; H02K 7/085
USPC ............. 417/360, 423.15; 416/204 R, 134 R; 310/62, 63; 464/92, 901; 403/291
See application file for complete search history.

(56) References Cited

U.S. PATENT DOCUMENTS 2,299,010 A * 10/1942 Doman ........................ 464/71
2,599,730 A *  6/1952 Sutton ........................... 464/92

(Continued)

FOREIGN PATENT DOCUMENTS

CN    2233132 Y    8/1996
CN    1465129 A   12/2003

(Continued)

OTHER PUBLICATIONS

International Search Report for International Application No. PCT/JP2011/003267, dated Jul. 5, 2011, 4 pages.

*Primary Examiner* — Devon Kramer
*Assistant Examiner* — Nathan Zollinger
(74) *Attorney, Agent, or Firm* — Brinks Gilson & Lione

(57) ABSTRACT

A fan motor includes a motor having a shaft, a fan, and a fan fixing section for rigidly connecting the fan to the shaft. The fan has a first mounting face for the fan to be integrated with the motor. The fan fixing section has a fan mounting plate mounted to an end of the shaft and including a second mounting face in a radial direction, and an elastic plate having elastic force. The first mounting face is connected to the second mounting face via the elastic plate.

12 Claims, 14 Drawing Sheets

(51) Int. Cl.
  *F04D 29/26* (2006.01)
  *F04D 29/66* (2006.01)
  *H02K 5/167* (2006.01)
  *H02K 7/08* (2006.01)

(56) References Cited

U.S. PATENT DOCUMENTS

| | | | | |
|---|---|---|---|---|
| 2,678,104 A | * | 5/1954 | Davis | 416/134 R |
| 2,680,559 A | * | 6/1954 | Morrill | 464/91 |
| 2,773,365 A | * | 12/1956 | Delf et al. | 464/96 |
| 2,853,140 A | * | 9/1958 | Forth, Sr. | 416/134 R |
| 3,005,497 A | * | 10/1961 | Klonoski et al. | 416/134 R |
| 3,084,963 A | * | 4/1963 | Beehler | 403/226 |
| 3,708,999 A | * | 1/1973 | Beehler | 464/96 |
| 3,890,061 A | * | 6/1975 | Nechay | 416/134 R |
| 4,197,054 A | * | 4/1980 | Morrill | 416/93 R |
| 4,245,957 A | * | 1/1981 | Savage et al. | 416/135 |
| 4,826,405 A | * | 5/1989 | Robb | 416/204 R |
| 4,917,573 A | * | 4/1990 | Sikula, Jr. | 416/134 R |
| 5,271,717 A | * | 12/1993 | Sato | 416/204 R |
| 5,871,335 A | * | 2/1999 | Bartlett | 416/244 R |
| 6,190,134 B1 | * | 2/2001 | Hudson | 416/244 R |
| 6,220,818 B1 | * | 4/2001 | Andulics et al. | 416/178 |
| 6,315,525 B1 | * | 11/2001 | Webb | 417/313 |
| 6,527,516 B2 | * | 3/2003 | Crevel | 416/204 R |
| 6,893,212 B2 | * | 5/2005 | Galassi | 415/121.2 |
| 8,147,203 B2 | * | 4/2012 | Chen et al. | 416/204 R |
| 8,292,577 B2 | * | 10/2012 | Burias | 415/206 |
| 8,814,519 B2 | * | 8/2014 | Linnenbrock | 416/148 |
| 2004/0013517 A1 | * | 1/2004 | Adrian | 415/119 |
| 2004/0027024 A1 | | 2/2004 | Kato et al. | |
| 2005/0232754 A1 | | 10/2005 | Ku et al. | |
| 2011/0158812 A1 | * | 6/2011 | Lu | 416/210 R |

FOREIGN PATENT DOCUMENTS

| | | |
|---|---|---|
| CN | 2695698 Y | 4/2005 |
| JP | 05-048562 U | 6/1993 |
| JP | 07-079539 A | 3/1995 |
| JP | 11-289735 A | 10/1999 |
| JP | 2003-023750 A | 1/2003 |

\* cited by examiner

FAN MOTOR, ON-VEHICLE AIR CONDITIONER USING THE FAN MOTOR, AND METHOD FOR ASSEMBLING FAN MOTOR

This application is a 371 application of PCT/JP2011/003267 having an international filing date of Jun. 9, 2011, which claims priority to JP2010-134758 filed Jun. 14, 2010, the entire contents of which are incorporated herein by reference.

TECHNICAL FIELD

The present invention relates a fan motor formed of a motor and a fan integrated with each other, an on-vehicle air conditioner using the same fan motor, and a method for assembling a fan motor.

BACKGROUND ART

When a shaft of a fan motor used as a blower of an on-vehicle air conditioner rotates, various vibrations are produced due to a structure of the fan motor. A multiple number of excitation components occurs per rotation of the motor in response to the number of magnet poles and the number of slots of stator core of the motor. These excitation components include torque ripple and cogging torque. In the fan motor, the excitation components are transmitted via the shaft to the fan mounted to the shaft. The fan receives reaction force, produced by the reaction to the force given to the air during the rotation of the fan. This reaction force received by the fan travels via a fan fixing section to the shaft, the motor, and a housing of the air conditioner. The on-vehicle air conditioner is formed of many mechanical components including the housing, motor, and fan. Since a large number of mechanical components is assembled into the on-vehicle air conditioner, which resonates with a given frequency (hereinafter this resonance is referred to as structural resonance). When the vibration caused by the excitation components resonates with the structural resonance caused by assembling the large number of mechanical components, a noise having a peak at a given frequency is produced.

Preventive measures against transmission of the vibration have been proposed. One of the proposals is this: An attenuation member made of viscous material is disposed in order to prevent the vibration caused by a motor from traveling via a shaft to a fan. For instance, refer to Patent Literature 1, which discloses that use of a thin attenuation member prevents itself from being deformed by compressive stress when the fan is screwed to the shaft.

However, use of a conventional fan motor in an on-vehicle air conditioner encounters the following problems: Fan motors to be used in a variety of applications are formed by combining various motors with various housings. An elastic member (conventionally it is referred to as attenuation member) having a given thickness should be used for lowering a peak of noises depending on an application of the fan motor. In such a case, Patent Literature 1 teaches that the elastic member having the given thickness cannot prevent itself from being deformed by the compressive stress, or cannot prevent the vibration caused by the motor from traveling via the shaft to the fan.

Patent Literature 1: Unexamined Japanese Patent Application Publication No. 2003-23750

DISCLOSURE OF THE INVENTION

A fan motor of the present invention comprises a motor having a shaft, a fan, and a fan fixing section for rigidly connecting the fan to the shaft. The fan has a first mounting face for the fan to be integrated with the motor. The fan fixing section includes a fan mounting plate having a second mounting face to be mounted to an end of the shaft and extending in a radial direction, and an elastic plate having elastic force. The first mounting face is connected to the second mounting face via the elastic plate.

The foregoing structure allows preventing the elastic plate from being deformed by compressive stress although the elastic plate having a given thickness is used, and on top of that, the foregoing structure prevents the vibration caused by the motor from traveling via the shaft to the fan. As a result, the present invention allows avoiding the resonance between the vibrations caused by the motor and the structural resonance frequency caused by assembling respective mechanical components, and thus preventing the production of the noise having a peak at a given frequency.

DETAILED DESCRIPTION OF THE PREFERRED EMBODIMENT

A fan motor of the present invention comprises a motor having a shaft, a fan, and a fan fixing section for rigidly connecting the fan to the shaft. The fan has a first mounting face for the fan to be integrated with the motor. The fan fixing section includes a fan mounting plate mounted to an end of the shaft and having a second mounting face extending in a radial direction, and an elastic plate having elastic force. The first mounting face is connected to the second mounting face via the elastic plate.

Use of the foregoing fan motor as a blower allows preventing the elastic plate from being deformed by compressive stress although the elastic plate having a given thickness is used, and on top of that, the foregoing structure prevents the vibration caused by the motor from traveling via the shaft to the fan. As a result, the present invention allows avoiding the resonance between the vibrations caused by the motor and the structural resonance frequency caused by assembling respective mechanical components, and thus preventing the production of the noise having a peak at a given frequency.

The on-vehicle air conditioner, in particular, is formed by assembling a large number of mechanical components such as a housing, motor, fan and so on. Assembly of the large number of mechanical components gives a structural resonance point to a sub-assembly of individual components, an assembly of functional blocks, and a completed on-vehicle air conditioner. Those structural resonance points are found in complicated state depending on the assembled condition.

Use of the elastic plate at a place, i.e. the fan fixing section, where transmission of the vibrations of the motor and the fan can be reduced, will prevent noises, because this transmission causes the noise having a peak at the given frequency.

The embodiment of the present invention is demonstrated hereinafter with reference to the accompanying drawings. Advantages obtained from the present invention are not limited to only this embodiment.

Exemplary Embodiment

Figure 1:
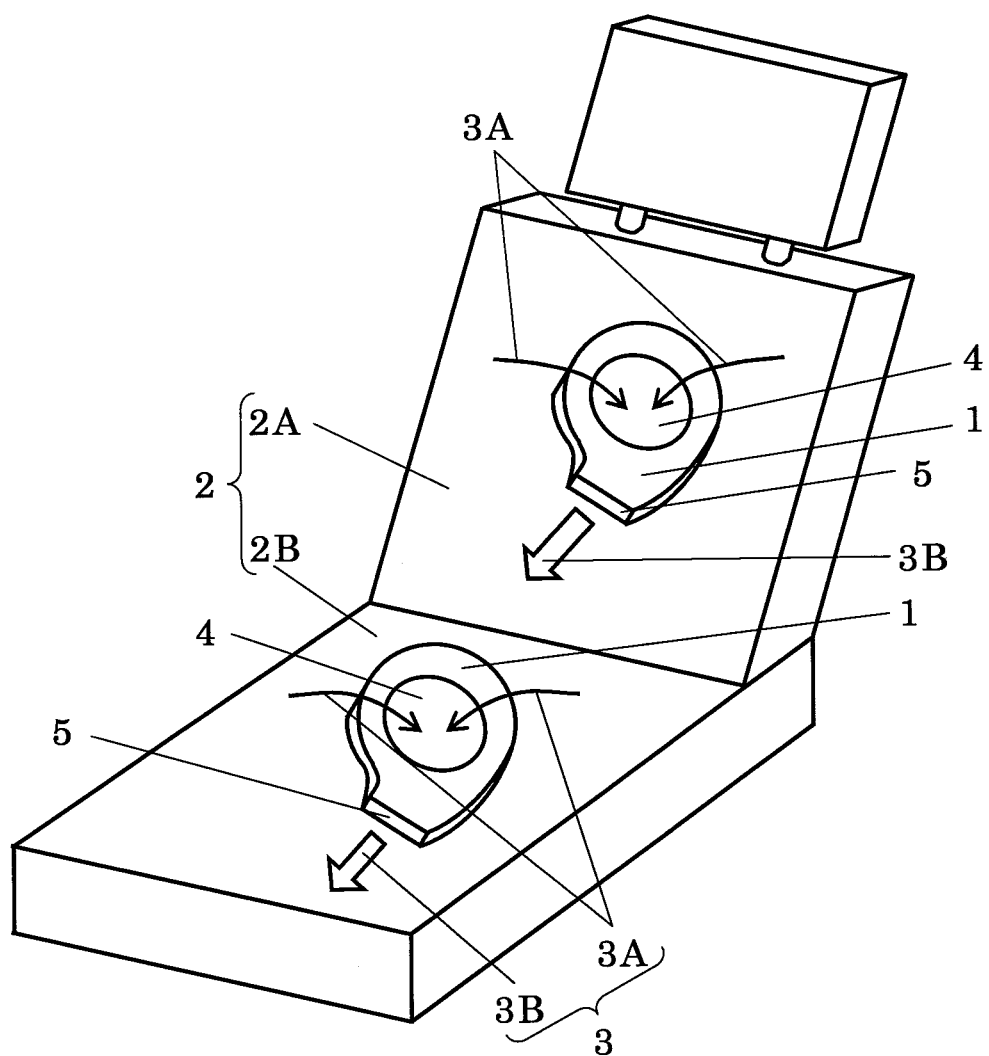
FIG. 1 is a perspective view schematically illustrating an on-vehicle air conditioner employing a fan motor in accordance with an embodiment of the present invention is built in a seat.
Figure 2:
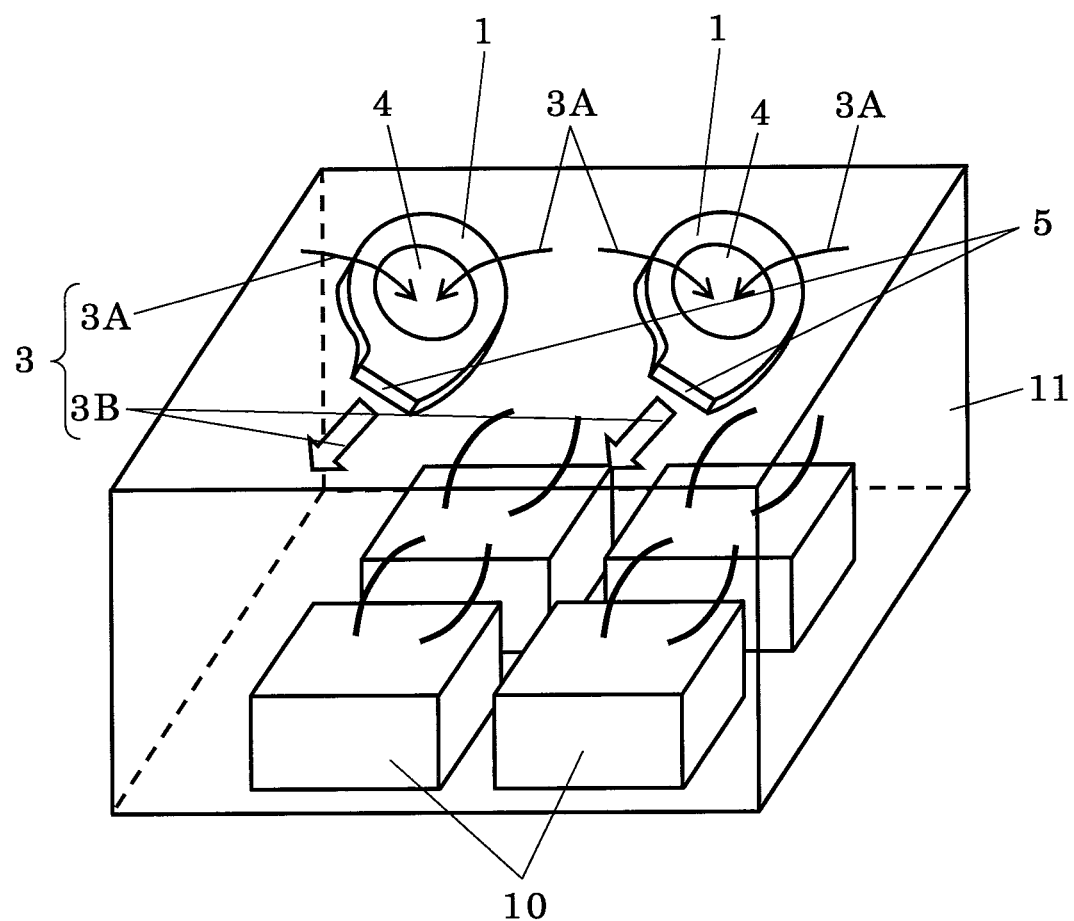
FIG. 2 is a perspective view schematically illustrating the on-vehicle air conditioner employing the fan motor in accordance with an embodiment of the present invention is accommodated in a container.

FIGS. 1 and 2 show usage examples of on-vehicle air conditioners employing fan motors of the present invention. In FIG. 1, on-vehicle air conditioner 1 is built in seat 2 where a driver or a person sharing a car sits. To be more specific, it is built in backrest 2A or seating face 2B of seat 2. The airflow of on-vehicle air conditioner 1 in use is indicated with arrows 3 (3A, 3B). Air conditioner 1 employs a sirocco fan, so that the air sucked (3A) through sucking port 4 is blown (3B) from blow-off port 5 disposed on a face substantially orthogonal to sucking port 4.

In FIG. 1, sucking ports 4 are disposed both on the surface side of backrest 2A and on the top face side of seating face 2B so that airflows 3 can be illustrated simply. However, when comfortableness to a driver or a person sharing the car is taken into consideration, or when simpler air suction to an on-vehicle air conditioner should be taken into account, sucking ports 4 are preferably disposed on the rear side of backrest 2A and on the lower side of seating face 2B.

FIG. 2 shows a case where on-vehicle air conditioner 1 is used for cooling on-vehicle battery 10. Use of a motor in smaller size allows downsizing this on-vehicle air conditioner 1 comparing with a conventional air conditioner. As a result, air conditioner 1 can be placed with a higher degree of freedom, so that on-vehicle air conditioner 1 can be placed in container 11 at a place suitable for cooling respective on-vehicle batteries 10 although container 11 has a complicated airflow circuit. As a result, a more efficient airflow circuit can be formed, and energy saving can be progressed.

Figure 3:
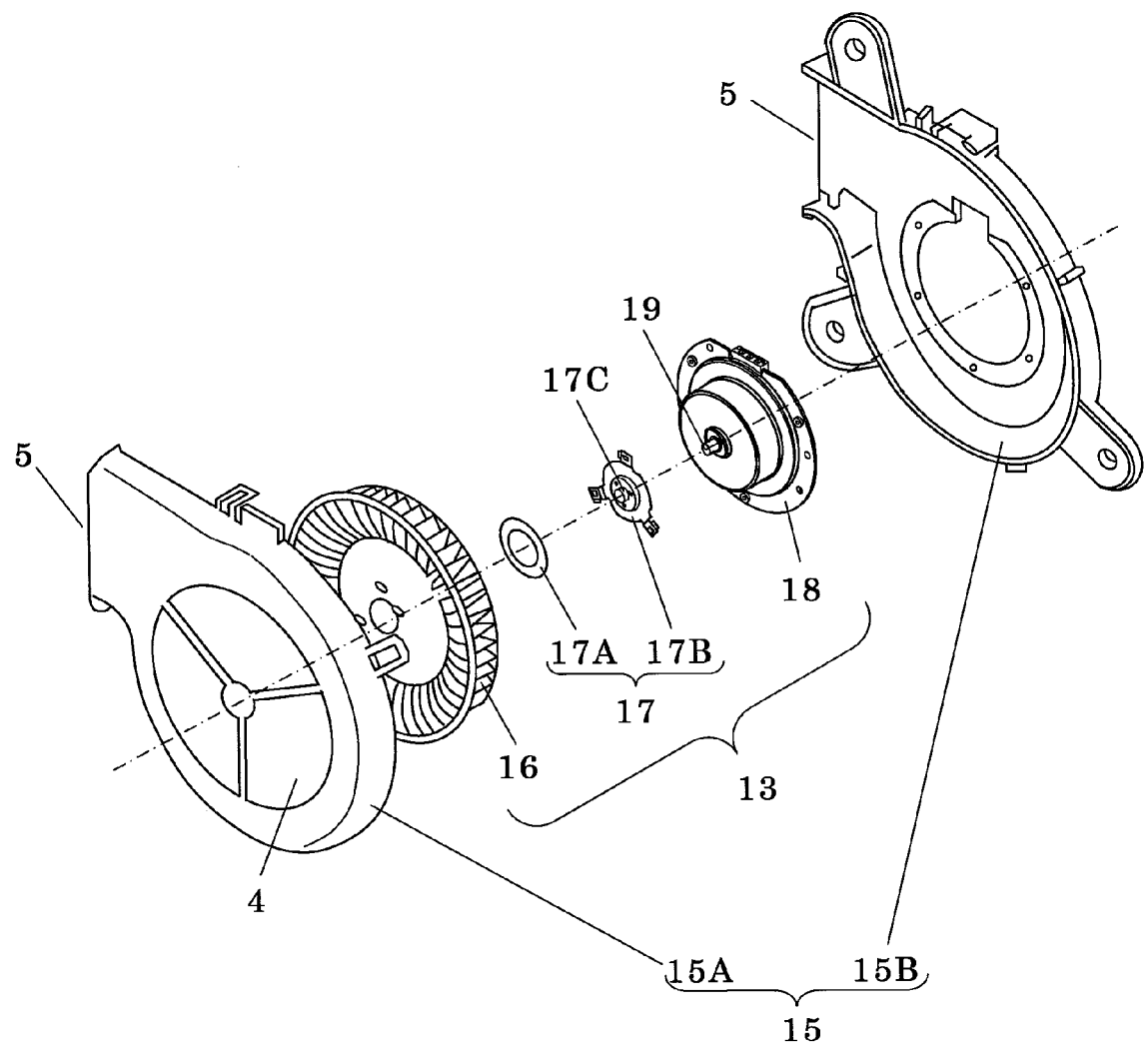
FIG. 3 outlines a structure of the on-vehicle air conditioner including the fan motor in accordance with the embodiment of the present invention.
Figure 4:
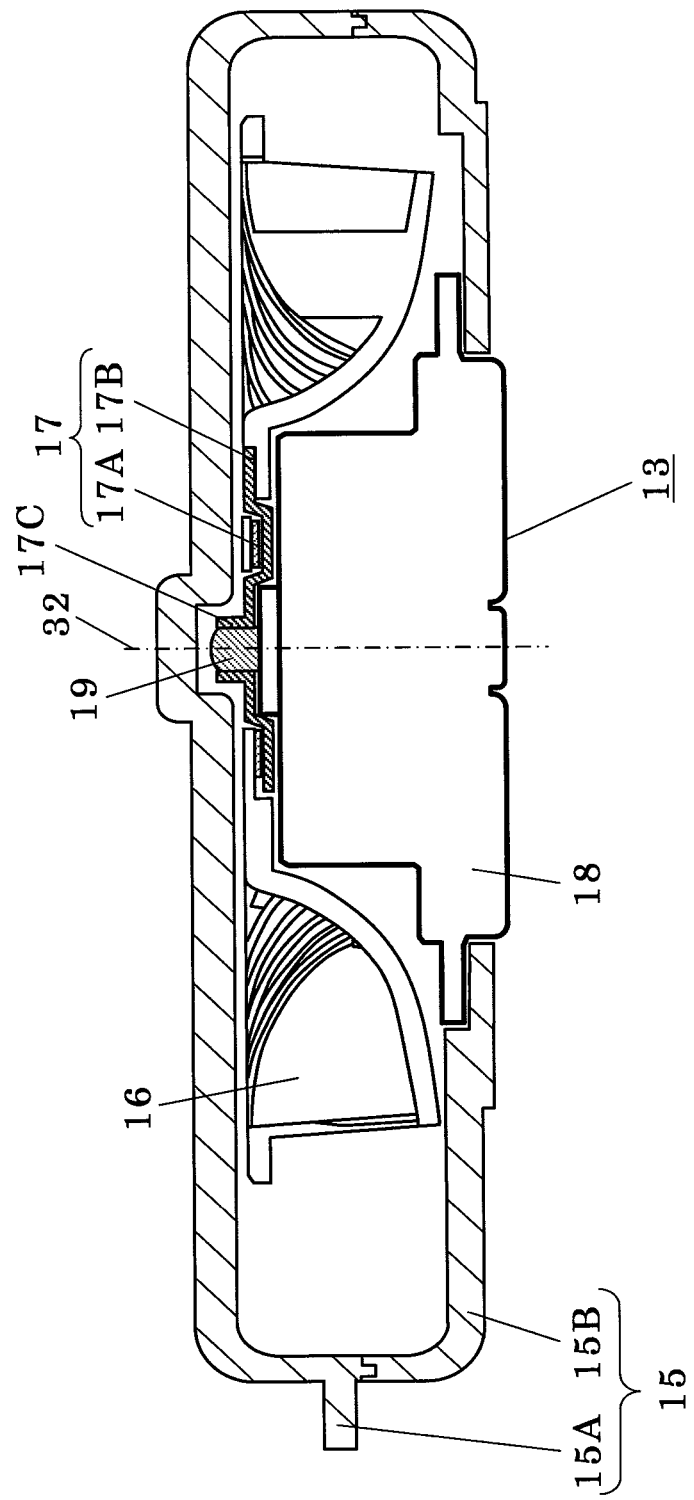
FIG. 4 is a sectional view of an essential part of the on-vehicle air conditioner in accordance with the embodiment of the present invention.

FIG. 3 outlines the on-vehicle air conditioner including the fan motor of the present invention. FIG. 4 is a sectional view of an essential part of the on-vehicle air conditioner.

Housing 15 (15A, 15B) accommodates fan 16, fan fixing section 17, and motor 18. Fan motor 13 is formed of fan 16, fan fixing section 17, and motor 18. Housing 15 includes sucking port 4 and blow-off port 5. Housing 15 is made of resin, e.g. polybutylene terephthalate (PBT), polycarbonate (PC), polypropylene (PP), or mixed material of these resins, or the mixed agent with glass fiber.

Fan fixing section 17 is formed of elastic plate 17A and fan mounting plate 17B. Plate 17A is made of rubber, e.g. silicone rubber, which can be replaced with adhesive that can retain a given elastic force after it is hardened. To be more specific, any silicone intimate mixture can produce an advantage similar to what is discussed previously. Instead of the rubber, en elastic foamed material can be used. To be more specific, rubber sponge or urethane sponge can produce an advantage similar to what is obtained by foregoing elastic plate 17A. Fan mounting plate 17B is made of metal or resin. An electric galvanizing steel sheet can be used as the metal material, and PBT, PC, PP or the mixed member of these resins, or the mixed agent with glass fiber can be used as the resin material. Fan mounting plate 17B is mounted to an end of shaft 19. Shaft 19 of motor 18 is press-fitted into hole 17C punched in fan mounting plate 17B at the center, thereby fixing fan mounting plate 17B to shaft 19. Fan mounting plate 17B fixed to shaft 19 can be connected to fan 16 such that they sandwich elastic plate 17A. Fan motor 13 is thus completed. Fan motor 13 is mounted in housing 15, thereby forming on-vehicle air conditioner 1. In the description below, fan 16 is mounted to fan fixing section 17, and the mounted face of fan 16 is referred to as a rear side, and a backside of the mounted face is referred to as a front side. The face of plate 17B on which fan 16 is disposed is referred to as a front side, and another face on which motor 18 is disposed is referred to as a rear side.

Figure 5:
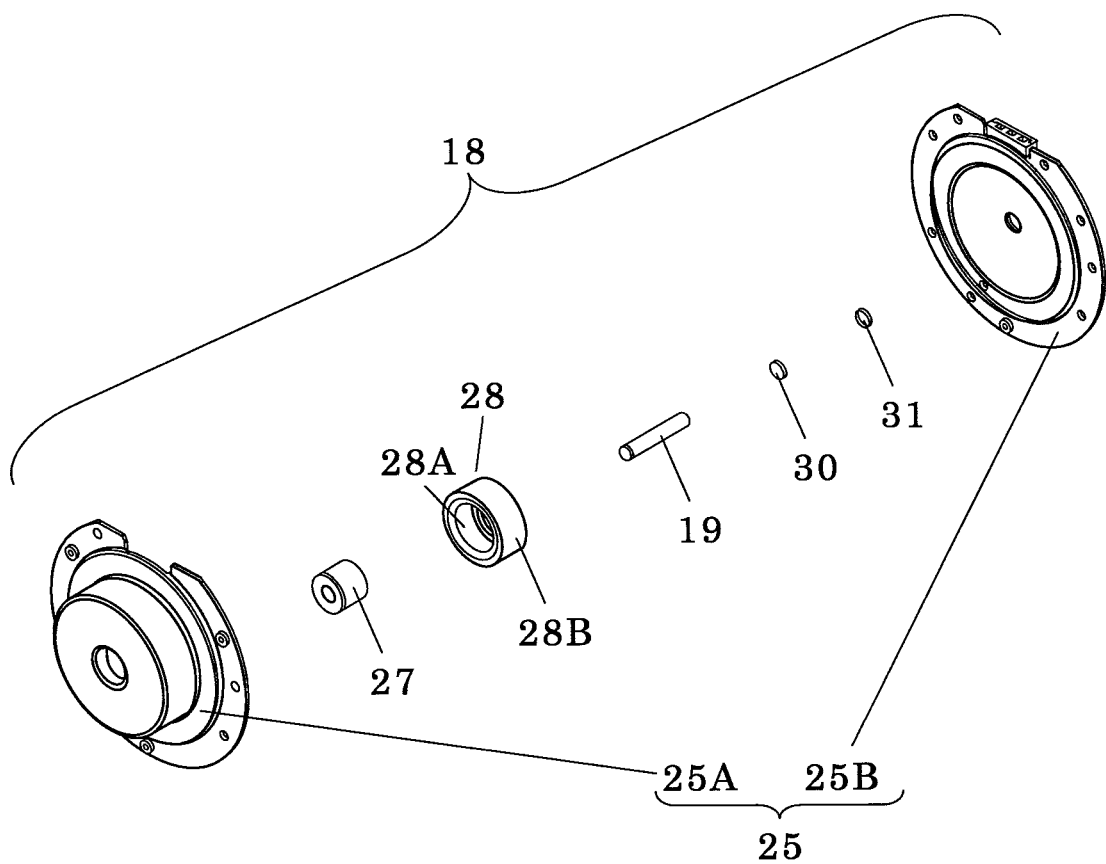
FIG. 5 outlines a structure of a motor in accordance with the embodiment of the present invention.
Figure 6:
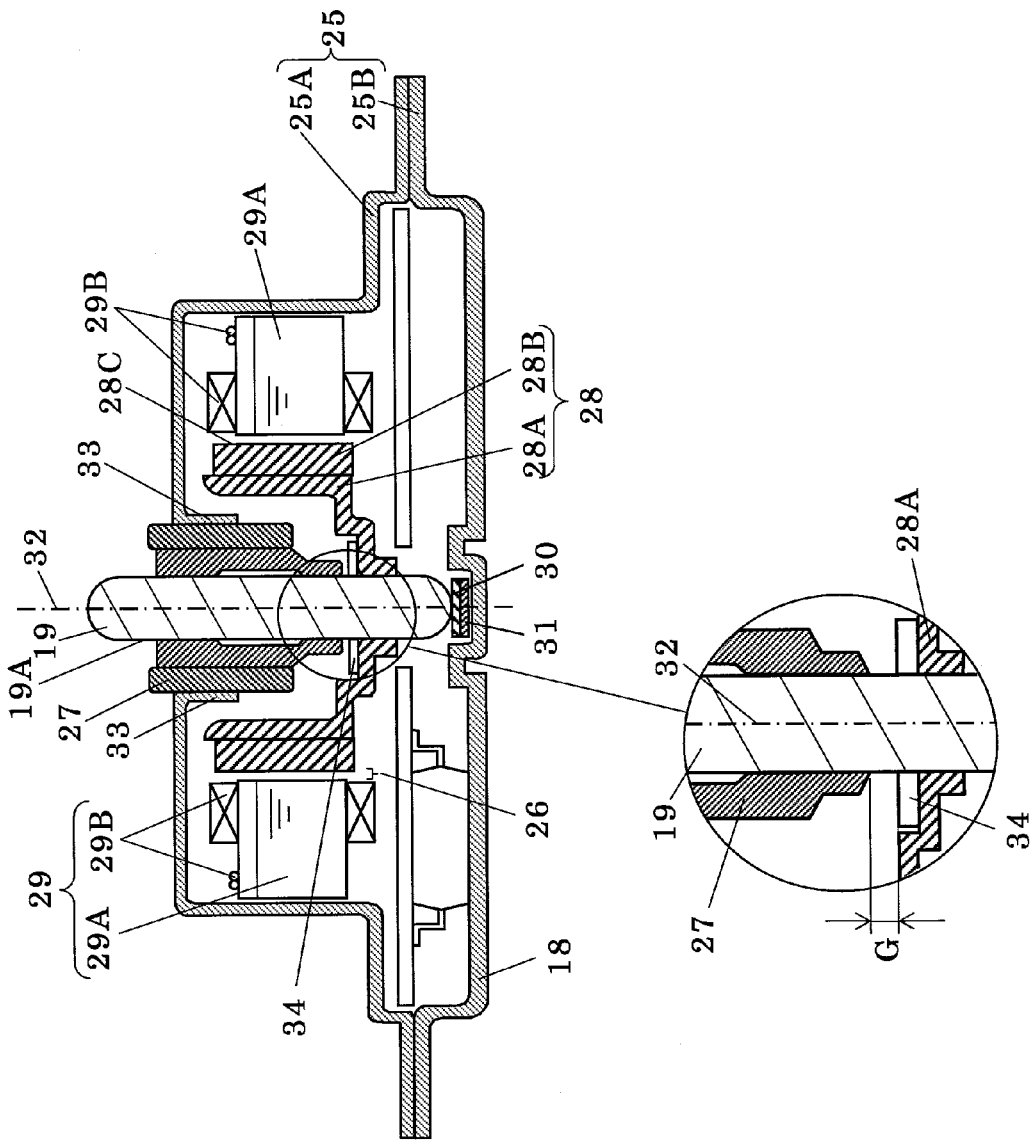
FIG. 6 is a sectional view of the motor in accordance with the embodiment.

Next, the structure of motor 18 is described with reference to FIG. 5 and FIG. 6. FIG. 5 outlines a structure of motor 18, and FIG. 6 is a sectional view of motor 18. This embodiment employs an inner-rotor type brushless motor. Motor housing 25 (25A, 25B) accommodates shaft 19, bearing 27, rotor 28, stator 29, thrust plate 30, and buffering plate 31.

Motor housing 25 used in this embodiment is made of electro-galvanizing steel sheet. Shaft 19 is made of martensitic stainless steel, and has dimensions of diameter=3 mm, length=17 mm. Bearing 27 is a sintered oilless bearing and made of Fe—Cu—Sn—(C) material. Bearing 27 is mounted onto outer wall 19A of shaft 19 such that it goes along axial direction 32 of shaft 19. Shaft 19 is supported, via bearing 27, by cylindrical section 33 of housing 25A. Rotor 28 is mounted to shaft 19 along axial direction 32, and includes rotor yoke 28A and rotor magnet 28B. Rotor yoke 28A is made of electro-galvanizing steel sheet and holds rotor magnet 28B by bonding for generating torque. Rotor magnet 28B is made of rare earth bonded magnet and is sensitive to a magnetic field generated by the stator that is discussed later. Stator 29 confronts outer wall 28C of rotor 28 via a space 26. Stator 29 is formed of iron core 29A and lead-wire 29B. A given electric current runs through lead-wire 29B, whereby an electromagnet can be formed, and the electromagnet generates a magnetic field, which is controlled such that shaft 19 can rotate via rotor 28 at a desirable rpm.

Figure 7:
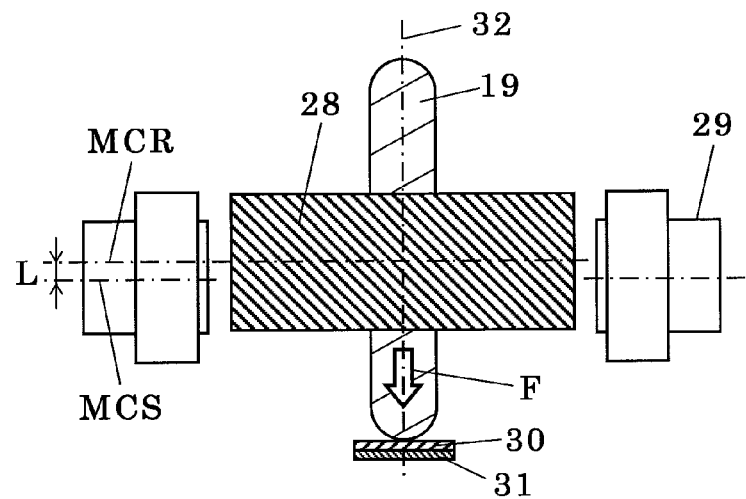
FIG. 7 illustrates a relation between a rotor and a stator in accordance with the embodiment.

FIG. 7 illustrates a relation between rotor 28 and stator 29. Rotor 28 and stator 29 are disposed such that magnetic center MCR of rotor 28 is away from magnetic center MCS of stator 29 by given distance L along axial direction 32 of shaft 19. Rotor 28 and stator 29 have restoring force F formed of magnetic attraction force and acting along a direction to cancel distance L. Restoring force F is indicated with arrows in FIG. 7, and thrust plate 30 is disposed in axial direction 32 and also in a restoring-force acting direction.

As shown in FIG. 6, washer 34 is disposed between rotor yoke 28A and bearing 27 and along shaft 19. Space G is provided between washer 34 and rotor yoke 28A or between washer 34 and bearing 27.

Figure 8:
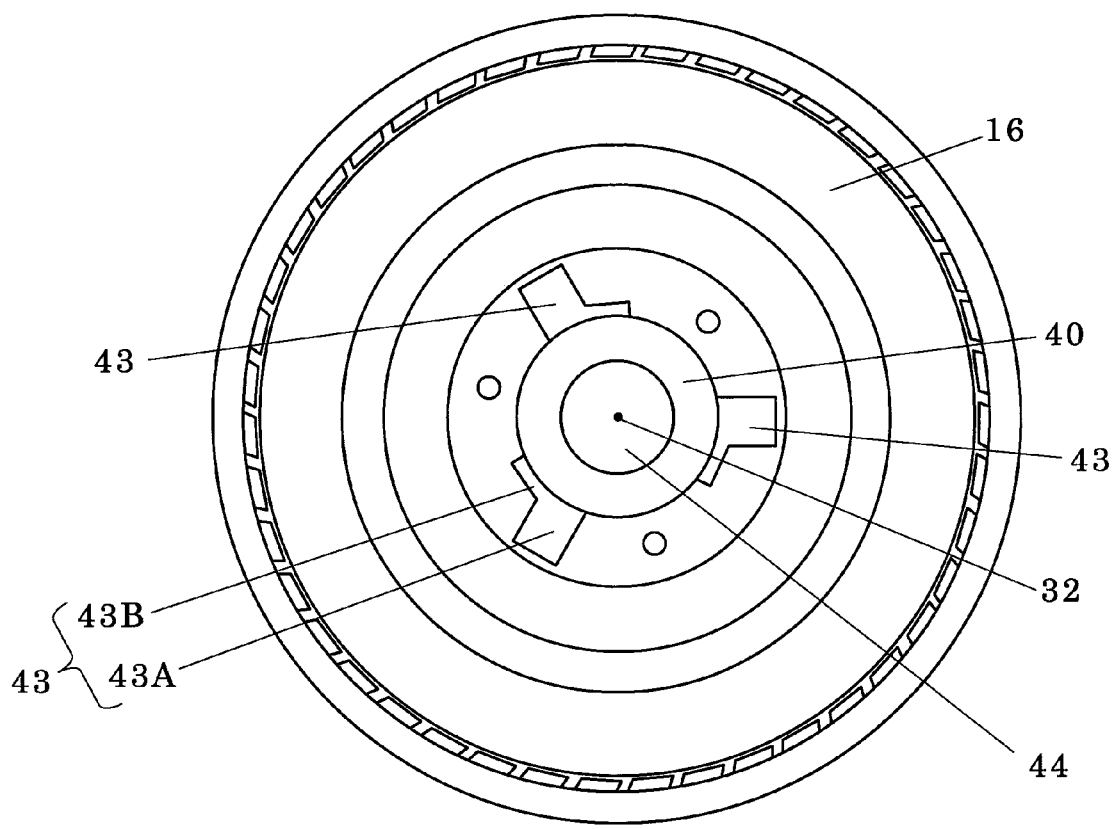
FIG. 8 is a rear view of the fan in accordance with the embodiment.

Fan fixing section 17 is detailed hereinafter, fan fixing section 17 is used for fixing fan 16 to shaft 19 of motor 18 employed in fan motor 13 of on-vehicle air conditioner 1. FIG. 8 is a rear view of fan 16 viewed from fan fixing section 17 shown in FIG. 3. Fan 16 has a center hole 44 centering on the shaft center and along a radial direction orthogonal to axial direction 32. In this embodiment, circular center hole 44 is used as an example. Fan 16 further includes first mounting face 40 and multiple mounting holes 43 in this order from the center toward the outer periphery on its rear side. First mounting face 40 is used for integrating fan 16 with motor 18 and forms a belt shape surrounding center hole 44 along circumferential direction. In this embodiment, first mounting face 40 having annular shape is used as an example. Mounting holes 43 penetrates from the rear side to the front side of fan 16. In this embodiment, mounting holes 43 are detailed such that each hole 43 includes hole 43A ready to receive second mounting section 46 and hole 43B for rotating mounting plate 17B along the circumferential direction with second mounting section 46 being received. Second mounting section 46 is detailed later.

Figure 9:
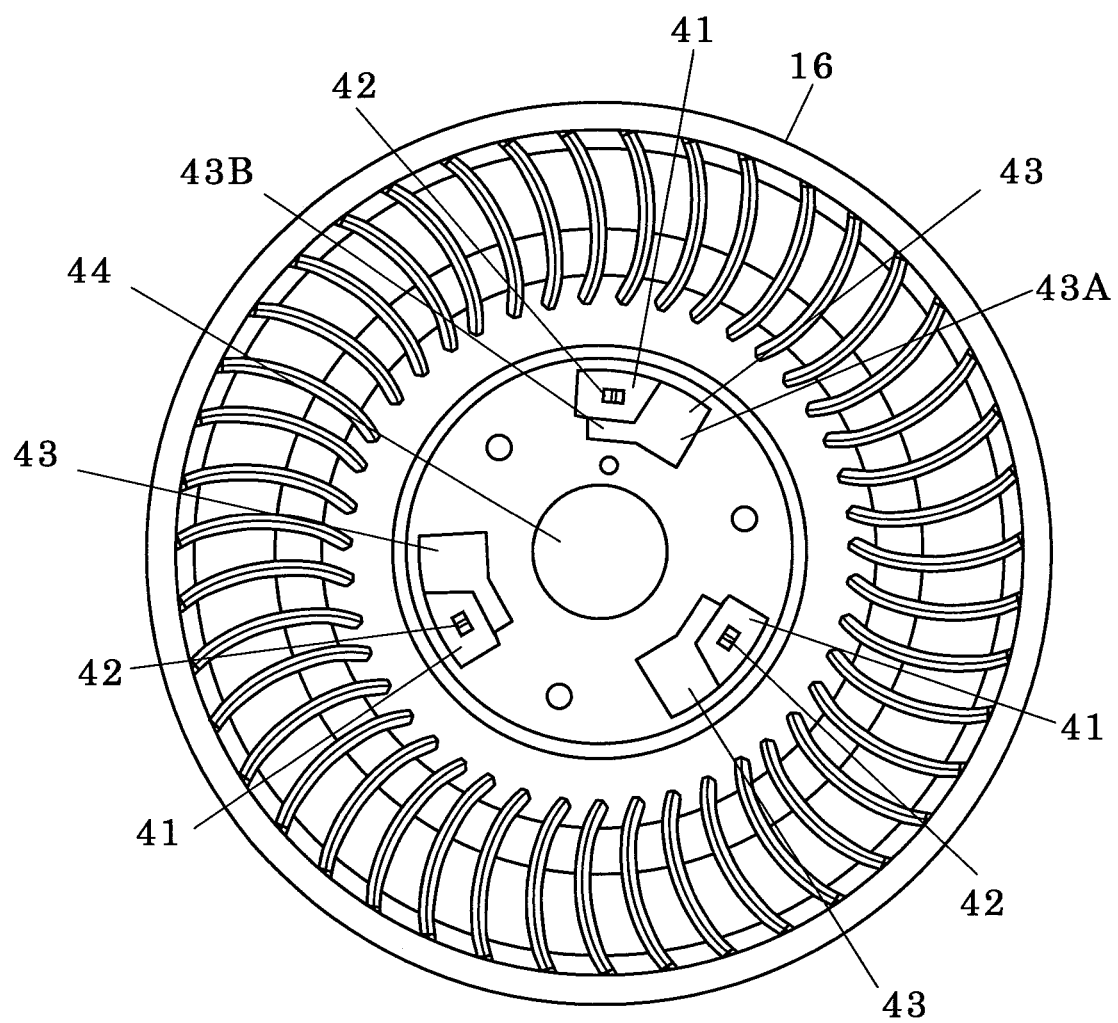
FIG. 9 is a front view of the fan in accordance with the embodiment.

FIG. 9 is a front view of fan 16 viewed from housing 15A shown in FIG. 3. As shown in FIG. 9, fan 16 includes multiple first mounting sections 41 on the front side. Each one of first mounting sections 41 is formed adjacent to respective mounting holes 43 along the circumferential direction. To be more specific, first mounting section 41 is adjacent closer to hole 43B rather than to hole 43A along the circumferential direction, and yet, it is located on outer side than hole 43B. Each one of first mounting sections 41 has projection 42 protruding toward the front side of fan 16.

Figure 10:
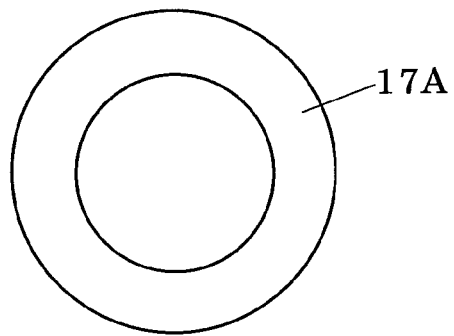
FIG. 10 is a front view of an elastic plate in accordance with the embodiment.

FIG. 10 is a front view of elastic plate 17A when fan fixing section 17 is viewed from fan 16 shown in FIG. 3. Elastic plate 17A forms a shape matching with the shape of first mounting face 40, so that it forms an annular shape in this embodiment as shown in FIG. 10.

Figure 11:
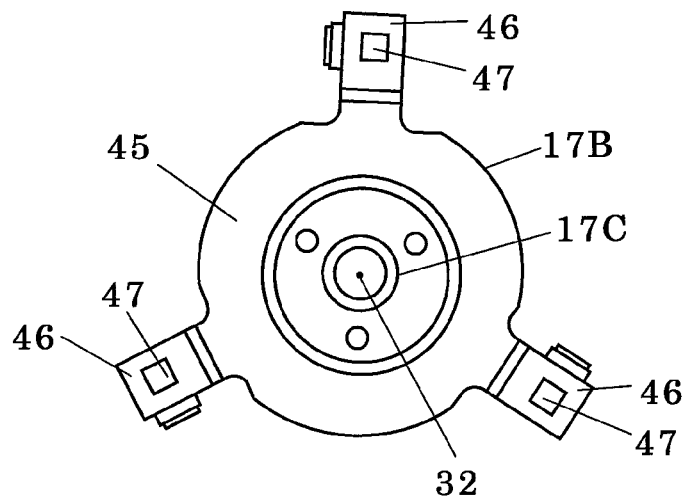
FIG. 11 is a front view of a fan mounting plate in accordance with the embodiment.

FIG. 11 is a front view of fan mounting plate 17B, which centers on the shaft center and includes second mounting face 45 and multiple second mounting sections 46 in this order from the center toward the circumference, i.e. along the direction orthogonal to axial direction 32. Each one of second mounting sections 46 includes recess 47. In this embodiment, three mounting sections 46 are disposed equidistantly along the circumferential direction. From the standpoint of mounting strength and holding balance, at least three mounting sections 46 and at least three mounting holes 43 are preferably prepared.

Each of second mounting sections 46 protrudes toward the front side rather than each of second mounting faces 45, on top of that, second mounting sections 46 and mounting holes 43 are formed such that respective protruding mounting sections 46 can be inserted into respective mounting holes 43 (more specifically mounting holes 43A) of fan 16. Recess 47 can be a dent formed on the rear side or a hole penetrating from the rear face to the front face.

Figure 12:
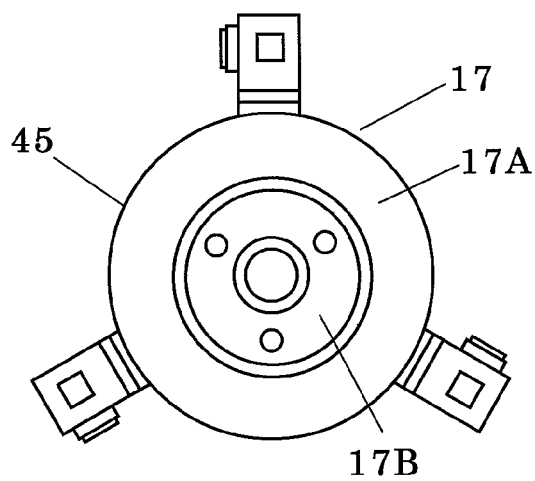
FIG. 12 is a front view of a fan fixing section in accordance with the embodiment.

As shown in FIG. 12, fan fixing section 17 is formed of elastic plate 17A and fan mounting plate 17B. Plate 17A is mounted to second mounting face 45 on the front side of fan mounting plate 17B.

Next, a structure of and a method for assembling fan motor 13 is demonstrated hereinafter. Fan motor 13 is formed of motor 18, fan 16, and fan fixing section 17 as discussed above.

Figure 13:
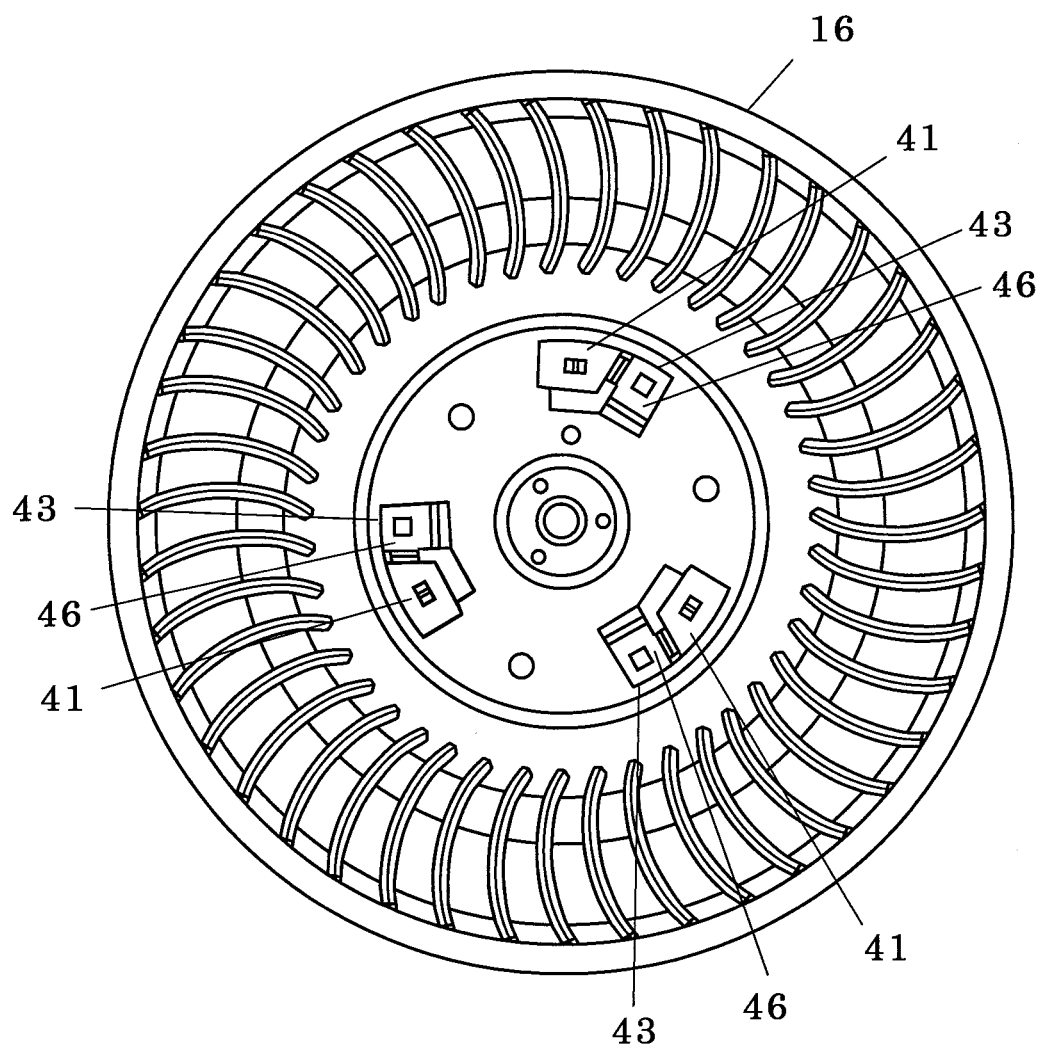
FIG. 13 is a front view of a fan in accordance with the embodiment.

First, as shown in FIG. 3, dispose elastic plate 17A on second mounting face 45 of fan mounting plate 17B, thereby forming fan fixing section 17. Then dispose fan fixing section 17 such that the front face thereof confronts the rear face of fan 16. As shown in FIG. 13, insert respective second mounting sections 46 of fan mounting plate 17 into respective holes 43A of mounting holes 43 of fan 16, whereby fan fixing section 17 is mounted to fan 16 such that elastic plate 17A confronts first mounting face 40 of fan 16.

Figure 14:
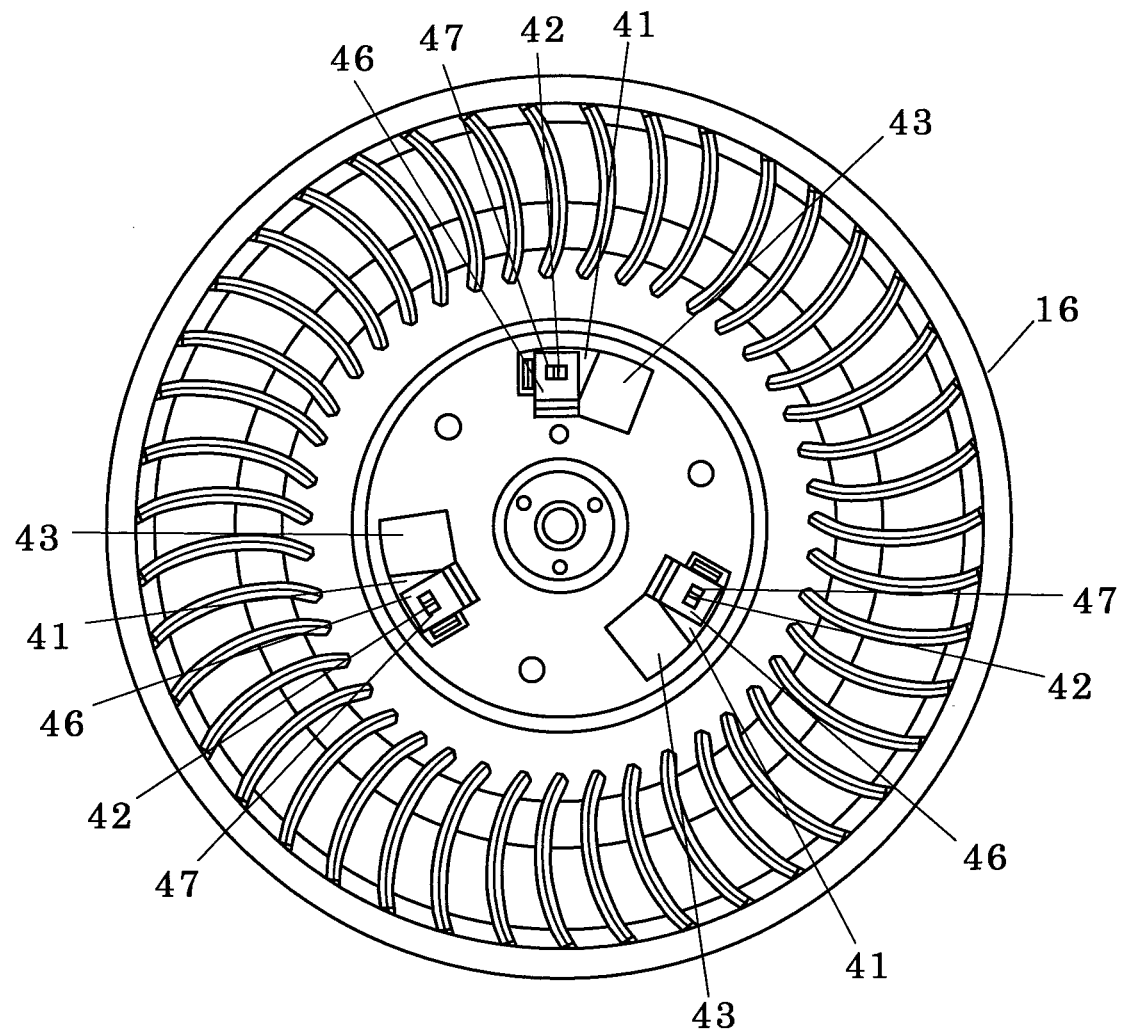
FIG. 14 is a front view of a fan in accordance with the embodiment.

Next, turn fan fixing section 17 counterclockwise. As shown in FIG. 13, since second mounting section 46 protrudes toward the front side of fan 16 from fan 16, second mounting section 46 slides toward first mounting section 41 on the front side of fan 16. As a result, as shown in FIG. 14, projection 42 of first mounting section 41 fits into recess 47 of second mounting section 46 so that first mounting section 41 engages with second mounting section 46. Dispose motor 18 on the rear side of fan 16 to which fan fixing section 17 is mounted, and press-fit shaft 19 of motor 18 into center hole 17C punched in fan mounting plate 17B, whereby fan mounting plate 17B is fixed to shaft 19. Fan motor 13 is thus completed.

The method of assembling fan motor 13 comprises the following steps: First, dispose elastic plate 17A on second mounting face 45, thereby forming fan fixing section 17, and then dispose fan fixing section 17 to confront fan 16. Next, insert second mounting section 46 into mounting hole 43. Then rotate fan fixing section 17 so that projection 42 of first mounting section 41 can fit to recess 47 of second mounting section 46. Press fit the shaft 19 of motor 18 into fan mounting plate 17B. Fan motor 13 is thus assembled through the foregoing steps.

Figure 15:
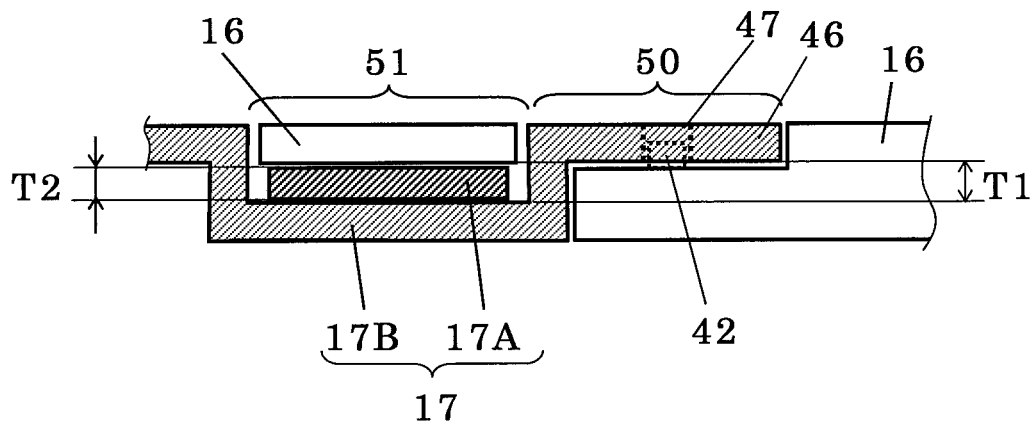
FIG. 15 is an enlarged view of an essential part of the fan motor in accordance with the embodiment.

The assembled state discussed above can be read from parts of FIG. 4, of which essential part is enlarged and shown in FIG. 15, which illustrates that the use of fan fixing section 17 allows section 50 and section 51 to be adjacent to each other. At section 50, fan 16 engages with second mounting section 46 of fan mounting plate 17B, and at section 51, fan mounting plate 17B is connected to fan 16 via elastic plate 17A. Fan motor 13 is thus formed by connecting first mounting face 40 of fan 16 to second mounting face 45 of fan mounting plate 17B via elastic plate 17A.

To be more specific, an appropriate setting of height T1 of first mounting face 40 and second mounting face 45 and height T2 of elastic plate 17A will prevent useless stress from being applied to elastic plate 17A when fan mounting plate 17B is connected to fan 16. Elastic plate 17A can be thus free from useless elastic deformation.

On top of that, as shown in FIG. 14, fan motor 13 is formed by engaging first mounting section 41 with second mounting section 46 on the front side of fan 16. This structure in addition to the structure employing elastic plate 17A will reduce a contact area, via rigid body, between motor 18 and fan 16 while the strength of holding fan 16 on shaft 19 can be maintained. The smaller contact area can prevent the vibration caused by motor 18 from traveling to fan 16 via shaft 19. In other words, the structure sandwiching elastic plate 17A allows maintaining the holding strength, and the engagement of first mounting section 41 with second mounting section 46 also allows maintaining the holding strength, whereby a desirable holding strength can be maintained. The foregoing structure allows reducing an engaging area between first mounting section 41 and second mounting section 46, so that the transmission of vibration can be reduced. From this standpoint, as illustrated in FIG. 11 and FIG. 12, the engaging area between first mounting section 41 and second mounting section 46 is thus formed smaller than the area of elastic plate 17A.

Figure 16:
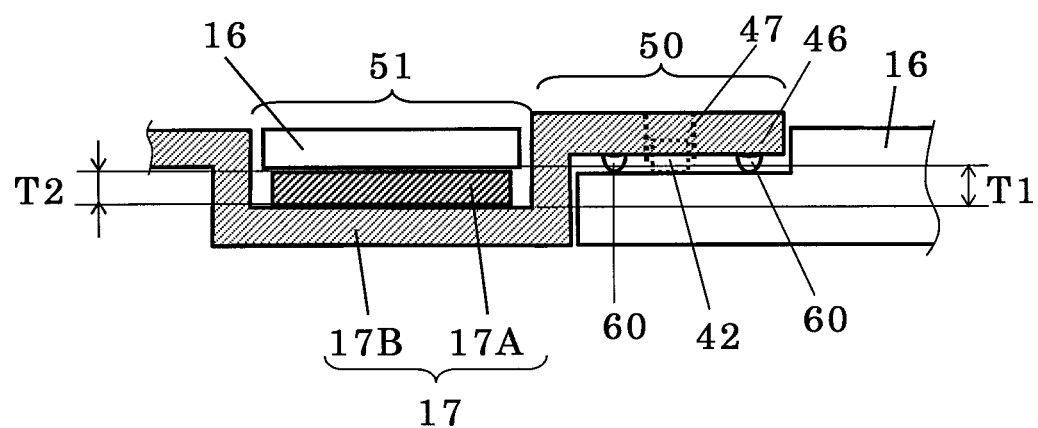
FIG. 16 is an enlarged view of an essential part of another fan motor in accordance with the embodiment.

To reduce the contact area at engaging section between first mounting section 41 and second mounting section 46, the structure shown in FIG. 16 can be employed. This structure differs from the structure shown in FIG. 15 in the presence of small projections 60 on the rear side of second mounting section 46 of fan mounting plate 17B. The presence of small projections 60 allows further reducing the contact area at engaging section between first mounting section 41 and second mounting section 46 than the structure shown in FIG. 15. The transmission of vibration can be thus reduced more effectively. It is preferable to place multiple small projections 60 uniformly on second mounting section 46 in order to allow fan mounting plate 17B to hold fan 16 steadily. Small projections 60 can be formed on the front side of first mounting section 41 instead of the rear side of second mounting section 46. The presence of small projections 60 on either one of first mounting section 41 or second mounting section 46 allows section 41 and section 46 to engage with each other via small projections 60, whereby the contact area at the engaging section can be reduced, and the transmission of vibration can be more effectively reduced.

In this embodiment, fan 16 includes first mounting section 41 at the outer circumferential side of first mounting face 40, and fan mounting plate 17B includes second mounting section 46 at the outer circumferential side of second mounting face 45. In other words, first mounting section 41 and second mounting section 46 are placed away from the center in the radial direction. After the second mounting section 46 is inserted into mounting hole 43, this structure allows rotating fan mounting plate 17B with ease for engaging second mounting section 46 with first mounting section 41. Comparing with a conventional method of mounting the fan by using screws or adhesive, the present invention thus proves that the fan can be mounted by only rotating fan mounting plate 17B. Efficiency of assembling fan motor 13 is thus increased.

Projection 42 and recess 47 discussed above can be replaced with each other with the same advantage maintained. To be more specific, either one of first mounting section 41 or second mounting section 46 includes the projection, and the remaining one includes the recess, or multiple projections and recesses can be formed.

An operation of on-vehicle air conditioner 1 discussed above is demonstrated hereinafter. As described previously, this embodiment employs an inner-rotor type brushless motor. In general, the structure of the motor generates excitation components such as torque ripple, cogging torque. Vibrations caused by the excitation components travel, via shaft 19, to fan mounting plate 17B press-fitted to shaft 19, and the vibrations arriving at the plate 17B can be mitigated by elastic plate 17A, thereby preventing the vibrations from traveling to fan 16.

As a result, vibrations transmitted from fan 16, via fan fixing section 17 and shaft 19, to each mechanical component can be reduced. The vibration generated during the rotation of the motor thus can be lowered. On top of that, noises having a peak at a given frequency can be reduced. The noises are generated by the resonance between the vibrations caused by the excitation components and structural resonance frequency caused by assembling the respective mechanical components.

The advantages of the present invention are described in the following specific cases.

Specific Case 1

Motor 18 employs an inner-rotor type brushless motor, and fan mounting plate 17B employs a metal plate made of electro-galvanizing steel plate. Fan 16 employs a sirocco fan made of PBT, PC, PP, mixed member thereof or the mixed agent thereof with glass fiber.

Fan motor 13 including motor 18 discussed above undergoes a comparison experiment, i.e. a fan motor without elastic plate 17A and a fan motor with elastic plate 17A are tested. Elastic plate 17A is made of silicone rubber of which thickness is 0.3 mm.

Figure 17:
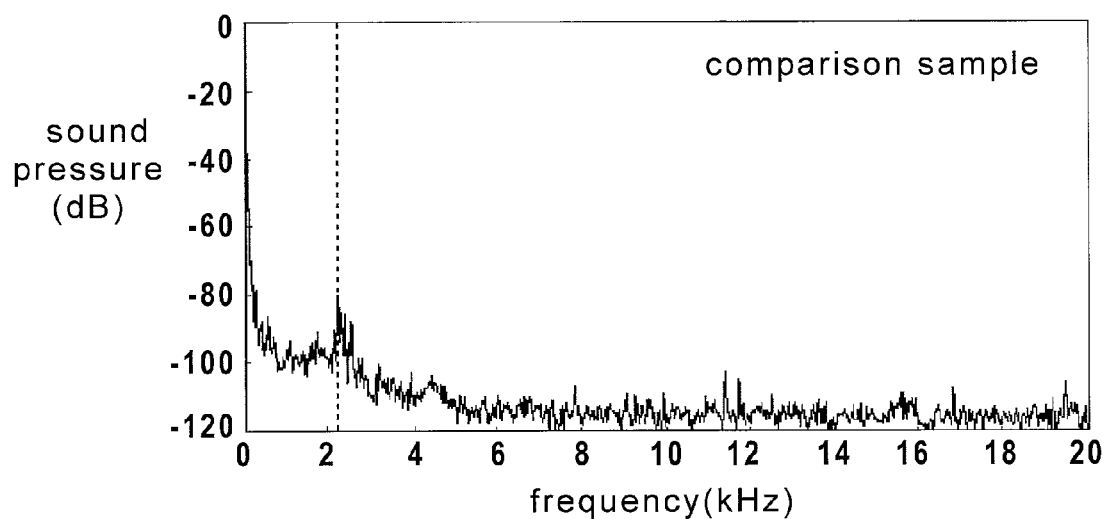
FIG. 17 shows characteristics of frequency and sound pressure of a comparison sample of fan motor to be used in a specific case.
Figure 18:
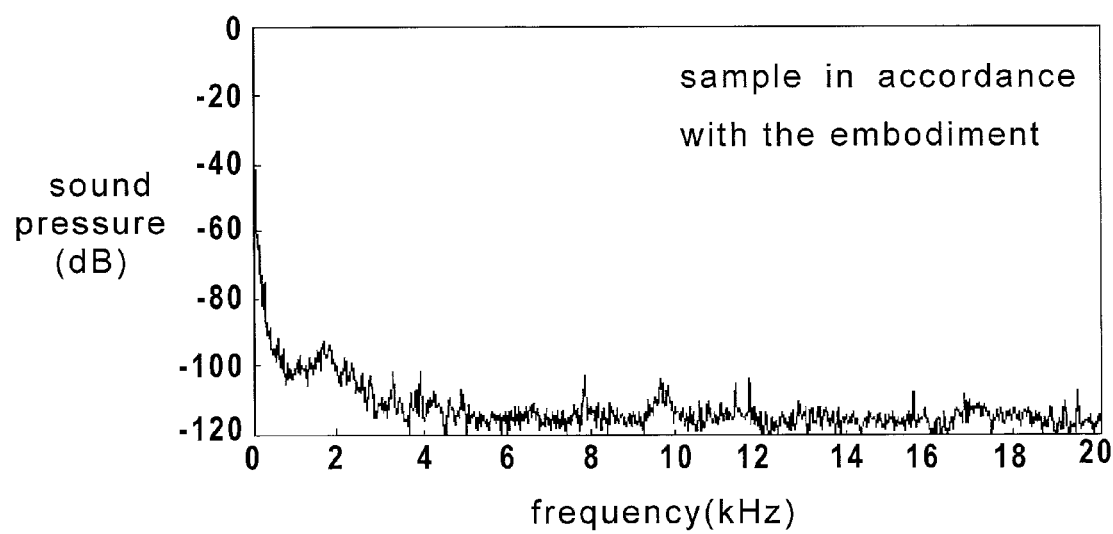
FIG. 18 shows characteristics of frequency and sound pressure of a fan motor to be used in the specific case.

FIG. 17 shows an experiment result of a comparison sample, i.e. fan motor 13 without elastic plate 17A, and FIG. 18 shows an experiment result of a sample in accordance with the embodiment, i.e. fan motor 13 with elastic plate 17A. When the fan is rotated at 1500 rpm, the peak at 2.2 kHz disappears, so that a reduction in sound pressure by −20 dB is achieved.

Figure 19:
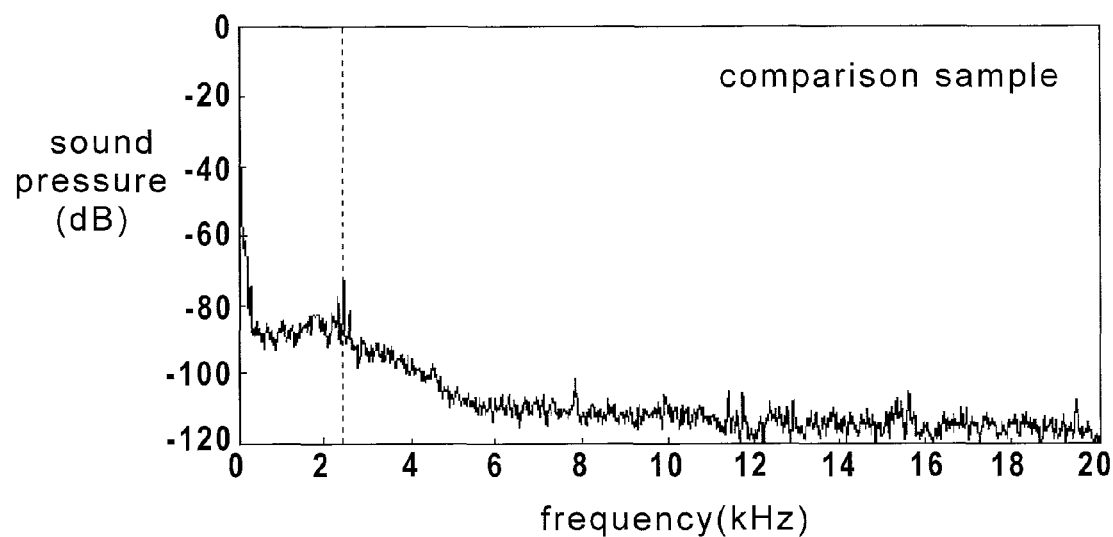
FIG. 19 shows characteristics of frequency and sound pressure of a comparison sample of fan motor to be use in another specific case.
Figure 20:
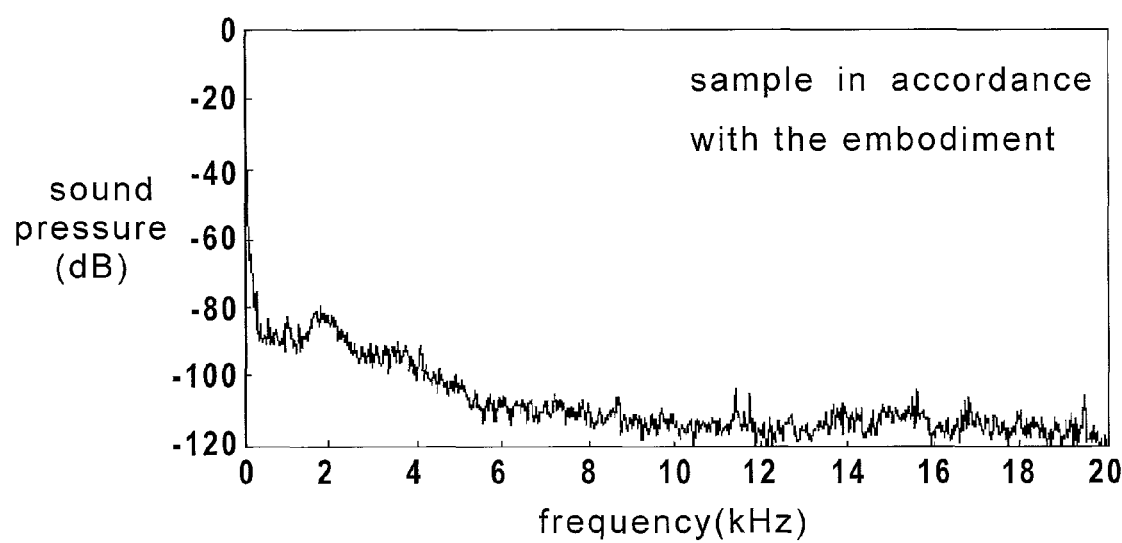
FIG. 20 shows characteristics of frequency and sound pressure of a fan motor to be used in the another specific case.

FIG. 19 and FIG. 20 also show another experiment result, i.e. the fan is rotated at 2580 rpm. FIG. 19 shows an experiment result of a comparison sample, i.e. fan motor 13 without elastic plate 17A, and FIG. 20 shows an experiment result of a sample in accordance with the embodiment, i.e. fan motor 13 with elastic plate 17A. The experiment proves that peak at 2.4 kHz disappears, so that a reduction in sound pressure by −20 dB is achieved.

In a conventional way, fan 16 has been mounted to shaft 19 by screwing with the aid of nuts.

An on-vehicle air conditioner to be mounted to a car or a train needs to be downsized and to have a thinner body; however, the on-vehicle air conditioner has been screwed down with the aid of nuts to a car or a train, so that it has been obliged to be a large size against expectation.

Use of the sample in accordance with this embodiment allows eliminating screws and nuts, and yet, allows connecting shaft 19 to fan 16 via fan fixing section 17. The structure in accordance with this embodiment allows reducing the height along axial direction, so that the on-vehicle air conditioner can be downsized and low-profiled.

INDUSTRIAL APPLICABILITY

The present invention can be widely used not only for the on-vehicle air conditioner but also for devices, in which the vibrations of a motor resonate with a structural resonance of the respective devices. The present invention allows lowering noises caused by the resonance and having a peak at a certain frequency.

DESCRIPTION OF REFERENCE MARKS 1 on-vehicle air conditioner
13 fan motor
16 fan
17 fan fixing section
17A elastic plate
17B fan mounting plate
18 motor
19 shaft
32 axial direction
40 first mounting face
41 first mounting section 42 projection
45 second mounting face
46 second mounting section
47 recess
60 small projection

The invention claimed is:
1. A fan motor comprising:
a motor having a drive shaft;
a fan;
a fan fixing section provided separately from the fan and securely attached to the fan to rigidly connect the fan to the drive shaft; and
an elastic plate provided separately from the fan and the fan fixing section and formed in a radial direction so as to encompass the drive shaft,
wherein the fan includes a first mounting face being formed in the radial direction so as to encompass the drive shaft,
wherein the fan fixing section includes a fan mounting plate securely mounted to an end of the drive shaft for rotation with the drive shaft, and the fan mounting plate includes a second mounting face being formed in the radial direction so as to encompass the drive shaft,
wherein the elastic plate is positioned and compressed between the first mounting face and the second mounting face,
wherein the fan includes the first mounting face on a mounting side of the fan a first mounting section on a front side opposite to the mounting side, and the fan further includes a mounting hole penetrating the fan from the mounting side to the front side, and
wherein the fan mounting plate includes a second mounting section, which is engaged with the first mounting section on the front side of the fan to securely attach the fan fixing section to the fan.
2. The fan motor of claim 1, wherein the fan includes the first mounting section on a radially outer side of the first mounting face, and the fan mounting plate includes the second mounting section on a radially outer side of the second mounting face.
3. The fan motor of claim 1, wherein one of the first mounting, section and the second mounting section includes a projection and a remainder of the two sections includes one of a recess and a hole, and the projection is engaged in one of the recess and the hole.
4. The fan motor of claim 1, wherein one of the first mounting section and the second mounting section includes small projections such that the first mounting section is in contact with the second mounting section only at the small projections.
5. The fan motor of claim 1, wherein the elastic plate is formed of one of rubber, foamed material, and adhesive.
6. An on-vehicle air conditioner employing the fan motor as defined in claim 1.
7. A method for assembling the fan motor of claim 3, the method comprising the steps of:
disposing the elastic plate on the second mounting face;
disposing the fan fixing section to confront the fan;
inserting the second mounting section into the mounting hole;
rotating the fan fixing section relative to the fan until the projection of the first mounting section engages into the recess of the second mounting section; and press-fitting the shaft into the fan mounting plate.
8. An on-vehicle air conditioner employing the fan motor as defined in claim 1.
9. An on-vehicle air conditioner employing the fan motor as defined in claim 3.
10. An on-vehicle air conditioner employing the fan motor as defined in claim 3.
11. An on-vehicle air conditioner employing the fan motor as defined in claim 4.
12. An on-vehicle air conditioner employing the fan motor as defined in claim 5.

* * * * *